US005394458A

United States Patent [19]

Allen et al.

[11] Patent Number: 5,394,458

[45] Date of Patent: Feb. 28, 1995

[54] SYSTEM FOR THE REMOTE MONITORING OF A REPRODUCTION APPARATUS

[75] Inventors: James D. Allen, Rochester; Tomas Roztocil; Peter R. Connelie, both of Caledonia; Thomas K. Sciurba, Webster, all of N.Y.

[73] Assignee: Eastman Kodak Company, Rochester, N.Y.

[21] Appl. No.: 643,592

[22] Filed: Jan. 18, 1991

[51] Int. Cl.[6] ........................ H04M 1/24; H04M 3/08; H04M 3/22; H04M 11/00

[52] U.S. Cl. ........................................ 379/1; 379/34; 379/100; 379/106; 379/107; 355/203; 355/204

[58] Field of Search ................. 379/106, 107, 102, 90, 379/100, 1, 34; 355/203, 204, 205

[56] References Cited

U.S. PATENT DOCUMENTS

| | | | |
|---|---|---|---|
| 3,893,175 | 6/1975 | Solomon | 360/6 |
| 4,062,061 | 12/1977 | Batchelor et al. | 364/900 |
| 4,071,911 | 1/1978 | Mazur | 364/900 |
| 4,124,887 | 11/1978 | Johnson et al. . | |
| 4,497,037 | 1/1985 | Kato et al. | 364/900 |
| 4,583,834 | 4/1986 | Seko et al. . | |
| 4,672,602 | 6/1987 | Hargrave et al. | 370/58 |
| 4,689,757 | 8/1987 | Downing et al. | 364/550 |
| 4,713,837 | 12/1987 | Gordon | 379/93 |
| 4,766,548 | 9/1988 | Cedrone et al. | 379/106 X |
| 4,947,397 | 8/1990 | Sobel et al. | 355/205 X |
| 5,216,461 | 6/1993 | Maekawa et al. | 375/204 X |
| 5,224,157 | 6/1993 | Yamada et al. | 379/106 X |

*Primary Examiner*—Stephen Chin
*Assistant Examiner*—Paul Loomis
*Attorney, Agent, or Firm*—Lawrence P. Kessler

[57] ABSTRACT

A reproduction apparatus includes a communication interface having an RS-232 interface and a modem, thereby permitting both on-site and remote communication with a diagnostic and administrative device. The RS-232 interface and modem enable the use of standard hardware and non-dedicated telephone lines for the purpose of recording apparatus usage, feature utilization, and performing diagnostic routines on the reproduction apparatus.

16 Claims, 2 Drawing Sheets

SYSTEM FOR THE REMOTE MONITORING OF A REPRODUCTION APPARATUS

BACKGROUND OF THE INVENTION

1. Field of the Invention

This invention relates to a system used to facilitate billing, determine customer use patterns, and perform diagnostic routines on reproduction apparatus and, more generally, to the fields of internal use recording and transfer of information from a machine to an information processing device.

2. Description of Related Art

Conventionally, reproduction apparatus have been provided as self-contained units. Accounting and diagnostic functions are generally accomplished through the use of computer controlled copy counters, jam detectors and indicators, and the like located with the copying machine units.

However, despite the widespread popularity of such reproduction apparatus, maintenance and accounting techniques have not kept pace with the recent improvements in the reproduction apparatus themselves. In particular, present maintenance and accounting practices have failed to effectively utilize recent improvements in the self-monitoring capabilities of conventional reproduction apparatus made possible by the use of microprocessor controllers and internal memories provided within the apparatus.

For example, in large business and government offices which use a large number of reproduction apparatus, it is desirable for cost allocation purposes to keep a central record of the total number of copies produced by all of the reproduction apparatus, and also of the number of copies produced by each section or division of the office, some of which may have access to two or more reproduction apparatus. In order to ensure that a reproduction apparatus will not run out of supplies, such as copy sheets, toner, and the like during use, frequent inspection of each reproduction apparatus must be made on an individual basis.

For accounting purposes, reproduction apparatus presently use a key counter system. Each reproduction apparatus is provided with a key counter for each user or section. The reproduction apparatus is energized by inserting the key into a corresponding key counter, which counts the number of copies produced. For billing or cost allocation, personnel must go to all of the reproduction apparatus, record the number of copies produced and also the number of copies indicated by each key counter. The total number of copies produced by all of the reproduction apparatus is determined by adding the totals for the individual reproduction apparatus, while the number of copies per section or user is determined by adding the number of copies indicated by the respective key counters in all of the reproduction apparatus.

This procedure is both time consuming and subject to error. In a large organization having many sections, each having access to many reproduction apparatus, a key counter for each section must be provided to each reproduction apparatus. Such a large number of key counters also necessitates additional purchase cost and installation space. In addition, mechanical key counters are prone to frequent malfunction.

For diagnostic purposes, the conventional procedure has been for an on-site operator to diagnose the problem by referring to service manuals. The operator is generally untrained in service procedures. If the malfunction cannot be corrected by the operator, he or she must call maintenance personnel. Such a process is inefficient and results in unnecessarily excessive "down time" of the reproduction apparatus. In addition, the operator is called upon to perform time consuming routine maintenance tasks such as toner and paper replenishment as the need arises.

To solve these problems, it has been proposed to automatically sense the operating parameters of the reproduction apparatus and store them in registers, and transmit the information to a central computer via dedicated communication lines. Such arrangements have the disadvantage of high installation costs and also the disadvantage that users of the apparatus cannot generally collect data themselves but rather must rely on a technician with access to the central processing unit.

It has also been proposed to provide systems for counting reproduction apparatus events and transferring event information to a central processing unit using a counter module or similar device. This approach suffers from the disadvantage that it requires non-standard software and hardware.

SUMMARY OF THE INVENTION

It is an objective of the invention to overcome the drawbacks of the prior art by providing a system for remote monitoring of reproduction apparatus, the apparatus each including a standard communication interface by which billing and diagnostic data may be transferred to a diagnostic and administrative device without the need for dedicated communication lines or data transfer equipment.

It is a further object of the invention to provide a system for remote monitoring of reproduction apparatus which enables both on-site data collection using a conventional portable or laptop computer and remote data collection via standard dedicated or non-dedicated phone lines.

These objectives are achieved by providing each reproduction apparatus to be monitored with a communication interface including a telecommunication modem for the purpose of transferring diagnostic and accounting information to a remote diagnostic and administrative device.

In a preferred embodiment of the invention, the reproduction apparatus is an electrographic copier/duplicator and the diagnostic and administrative device is a laptop computer. The communication interface for the electrographic copier/duplicator of this embodiment is provided with a standard RS-232 interface and a standard telephone modem.

DETAILED DESCRIPTION OF THE PREFERRED EMBODIMENTS

Figure 1:
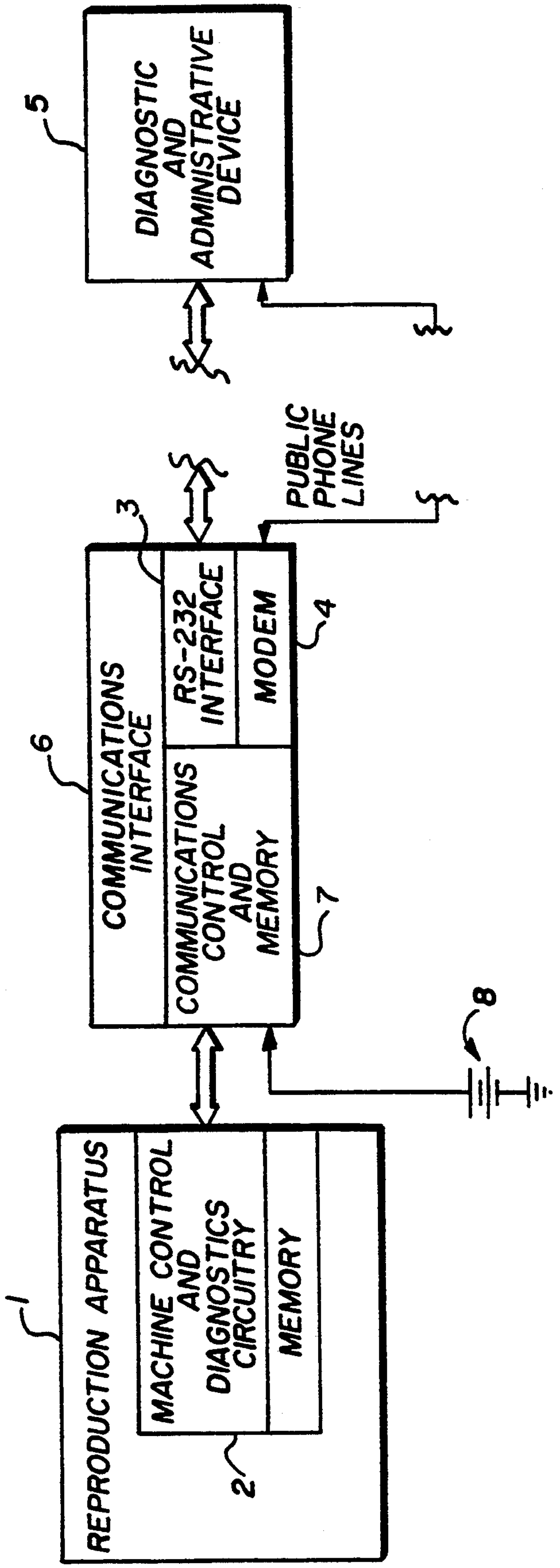
FIG. 1 is a schematic diagram showing a system for the remote monitoring of a reproduction apparatus according to a preferred embodiment of the invention.

FIG. 1 shows a schematically illustrated reproduction apparatus 1 and a diagnostic and an administrative device 5 arranged according to a preferred embodiment of the invention. Diagnostic and administrative device 5 is preferably a computer equipped to receive and transmit information to and from reproduction apparatus 1, including billing information and diagnostic information such as the service record of the reproduction apparatus in question. The reproduction apparatus 1 is typically an electrographic copier/duplicator or printer of any well known type such as shown, for example, in U.S. Pat. Nos. 4,583,834, 4,062,061 and 3,893,175. Reproduction apparatus 1 includes machine control and diagnostic circuitry 2. Circuitry 2 controls all mechanisms used in the copying process and includes a plurality of sensors, detectors and registers, or memories, for detecting and storing information related to apparatus use, utilization of features of the apparatus, and required repairs or maintenance. The term "utilization of features" is well understood in the art. It refers to use of certain accessories with the reproduction apparatus (e.g., sorter, stapler, accent color developer station), or operation of the reproduction apparatus according to a predetermined procedure taking advantage of various capabilities of the reproduction apparatus (e.g., duplex copying, chapterizing of booklets, selectively editing particular pages of a multi-page document).

In an especially preferred embodiment of the invention, communication between the reproduction apparatus 1 and the diagnostic and administrative device 5 is established via a communications interface 6. The communications interface 6 incorporates a communication control and memory 7, backed up by an independent power source 8 (battery, for example), an RS-232 interface 3 and a modem 4. Through the control and memory 7, communication may be effected either directly via the RS-232 interface 3 or via the telecommunication modem 4. The term "RS-232" refers to a digital interface standard developed by the Electronic Industry Association. RS-232 interfaces included a serial data port and data line, together with additional input and output control and/or status lines. Such interfaces are commonly used to interconnect a CPU or microcomputer system with peripheral devices such as a modem. It will, of course, be appreciated that other similar computer system interfaces may be substituted for the RS-232 interface, although the RS-232 standard is preferred.

Modem 4 converts a digital signal output by the machine control and diagnostic circuitry 2 of the reproduction apparatus 1, via communication control and memory 7 of the communications interface 6, into a modulated analog signal capable of being transmitted over a standard (public) non-dedicated telephone line. Signal transfer to the modem 4 occurs using the standard RS-232 protocol, including both an asynchronous data signal and data transmit and received signals so that the presence of the modem is transparent to the reproduction apparatus. Thus, reproduction apparatus 1 and device 5 communicate as if they were directly connected together on an RS-232 line. Preferably, modem 4 is Hayes compatible and capable of transmitting and receiving data at a rate of at least 1200 baud. Modem 4 may be mounted on the communications interface 6 circuit board within the reproduction apparatus or mounted externally thereof.

Because modem 4 converts the RS-232 format signals utilized by the communications control and memory 7 of the communications interface 6 into analog signals suitable for transmission over an ordinary telephone line, and conversely converts analog signals received from the telephone line into standard RS-232 format signals, it is possible to connect diagnostic and administrative device 5 to reproduction apparatus machine control and diagnostic circuitry 2 either on-site or via a non-dedicated telephone system. Thus, device 5 may take the form of a laptop or portable computer with an internal modem or storage medium such as a magnetic disk drive.

Suitable computers readily usable as the diagnostic and administrative device 5 include the Toshiba T1200 laptop computer, although the invention easily also permits connection to a mini or mainframe computer located at the central area of the building in which the reproduction apparatus is located, or at a more remote location. Use of a laptop computer has the advantage that the diagnostic and administrative device 5 may be physically transported from apparatus to apparatus as required, while still utilizing standard equipment and providing sufficient computing power to perform all necessary diagnostic and administrative tasks.

The internal modem in a laptop computer may be connected to modem 4 via a standard modular telephone cable in a manner well-known to those skilled in the art. The laptop computer then issues commands and collects data via the telephone line and modem 4 under the control of the operator. On the other hand, in cases where modem 4 is connected to a telephone system or private branch exchange (PBX) system, modem 4 may automatically place a service call, without operator intervention, when a diagnostic limit for any internal reproduction apparatus error code is reached. The reproduction apparatus initiated remote diagnostic limit resides in non-volatile memory of the machine control and diagnostic circuitry 2 and conventionally defines an unacceptable number of error occurrences in an operating parameter of the reproduction apparatus.

A software switch is preferably allocated in the non-volatile memory of the reproduction apparatus circuitry 2 for the purpose of toggling between "interactive" and "passive" remote assistance. Interactive remote assistance is defined as the ability to remotely start the reproduction apparatus main drive, actuate outputs, or initiate special programs using commands sent from the administrative and diagnostic device 5. This mode requires a trained operator and two phone lines at the site, one voice line and one telecommunications line (or a single data/voice line when more widely available). Passive remote assistance is defined as the ability to examine the reproduction apparatus' memory and monitor but not change apparatus outputs when the reproduction apparatus is started by the operator. This mode requires no special operator training and only one phone line for telecommunications.

As noted above, the communications control and memory 7 of the communications interface 6 is preferably provided with a separate independent power supply 8 (such as a battery or other power source). Consequently, data related to reproduction apparatus use, feature utilization of the reproduction apparatus, paper consumption, error history and billing will be available at all times for retrieval upon request from an administrative and diagnostic device 5. In addition, the following memory items are preferably available with reproduction apparatus power on: an error frequency table, an error occurrence table, set points and programmable parameters, and copy controller account. The memory 7 also serves as a backup memory, accepting new data when the reproduction apparatus power is off and then copying that information to the other storage areas in the reproduction apparatus when reproduction apparatus power is restored. A circuit board associated with the modem also includes appropriate self-test diagnostics which operate on the modem itself. Operational errors are desirably captured and logged into memory 7 as they occur.

Figure 2:
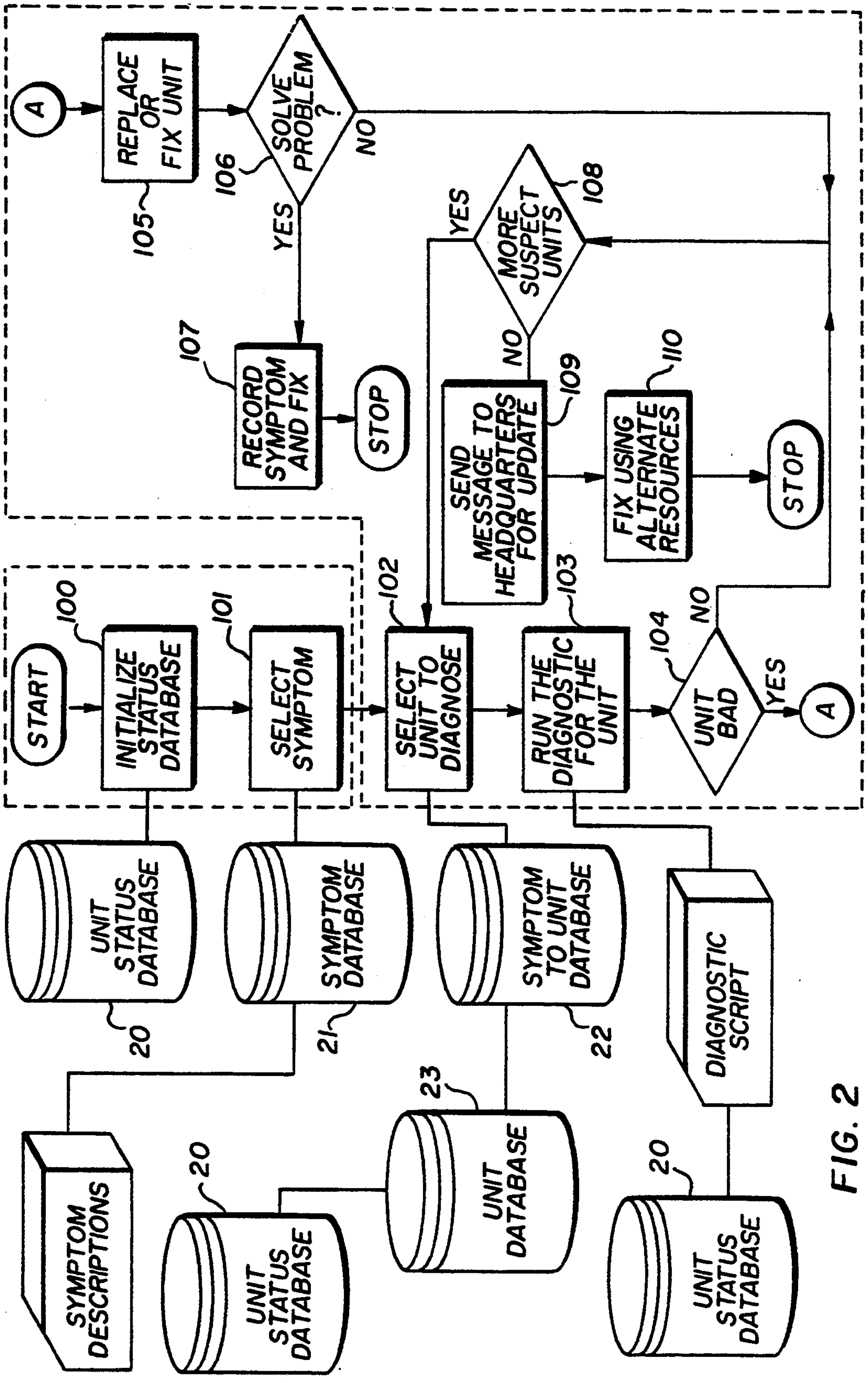
FIG. 2 is a flowchart of an illustrative method of using the preferred system of FIG. 1.

In operation, when the diagnostic and administrative device 5 is connected to the reproduction apparatus 1, the device identifies a unit in the reproduction apparatus, for example, a particular motor, and executes a diagnostic routine as shown in FIG. 2. Memory associated with the machine control and diagnostic circuitry 2 of reproduction apparatus 1 may be arranged in any convenient manner, and preferably includes a plurality of registers for storing status of error codes according to the reproduction apparatus unit where the code originated.

In an exemplary diagnostic routine, the diagnostic and administrative device 5 initializes a status database 20 in step 100 and selects a symptom to diagnose from system database 21 in step 101. After selecting a particular unit to diagnose from unit database 23 (step 102), and calling up a symptom to unit database 22, which stores reasons and probabilities for various symptom messages for the unit, the diagnostic script is run in step 103. If a symptom code is received, step 104, the diagnostic routine jumps to step 105 which calls for a replacement or fixing of the unit. Upon successful completion of the repair, step 106, the symptom and solution are recorded, step 107. Otherwise, the diagnostic routine checks for more suspect units, step 108, and goes back to step 102. If the problem cannot be solved by fixing the suspect unit, and no other unit is suspect, the diagnostic routine jumps to step 109 and initiates or causes the operator to call for help and respond accordingly, step 110.

It will be appreciated that numerous variations of the invention are possible. For example, while the preferred system has been discussed in the specific context of a reproduction apparatus, it will be appreciated that the inventive concept of adding a standard interface and modem for billing and diagnostic purposes may be used in a variety of contexts involving complex machinery of the type having internal control circuitry and memories or registers for recording machine errors or usage.

It is likely that other such variations will occur to those skilled in the art, and it is therefore intended that the scope of the invention be limited solely by the appended claims.

We claim:

1. A system for the remote monitoring of an electrographic copier/duplicator reproduction apparatus having an internal memory, said apparatus comprising:

a communication interface in said reproduction apparatus including means for collecting data regarding operation of said reproduction apparatus and for permitting said data to be output from said apparatus, said data comprises reproduction apparatus usage, utilization of features of such reproduction apparatus and billing data storage in said internal memory, said communication interface further including modem means for transmitting said data from said communication interface to a non-dedicated telephone line; and a diagnostic and administrative device including data reception means for receiving said data from said telephone line or directly from said communication interface.

2. A system as claimed in claim 1, wherein said modem means is an internal Hayes compatible modem.

3. A system as claimed in claim 1, wherein said modem means is an externally mounted modem connected via RS-232 interface.

4. A system as claimed in claim 1, wherein said communication interface further includes its own internal memory and power supply.

5. A system as claimed in claim 1, wherein said diagnostic and administrative device is a portable computer.

6. A system as claimed in claim 5, wherein said portable computer is a laptop computer.

7. A system as claimed in claim 1, wherein said data further comprises reproduction apparatus diagnostic data stored in said internal memory.

8. A system as claimed in claim 1, wherein said communication interface further includes command input means for receiving commands transmitted from said diagnostic and administrative device via said telephone line and modem.

9. A reproduction apparatus having an internal memory, said apparatus comprising:

internal data collection means for collecting data regarding operation of said reproduction apparatus, said data comprises reproduction apparatus usage, utilization of features of such reproduction apparatus and billing data stored in said internal memory; and communication interface means including an interface for permitting said data to be output from said reproduction apparatus, and modem means for transmitting said data from said communication interface, whereby data is permitted to be output from said reproduction apparatus to a diagnostic and administrative device via a non-dedicated telephone line or directly from said communication interface.

10. A reproduction apparatus as claimed in claim 9, wherein said modem means is an internal Hayes compatible modem.

11. A reproduction apparatus as claimed in claim 9, wherein said modem means is an externally mounted modem connected via RS-232.

12. A reproduction apparatus as claimed in claim 9, wherein said communication interface further includes its own internal memory and power supply.

13. A reproduction apparatus as claimed in claim 9, wherein said diagnostic and administrative device is a portable computer.

14. A reproduction apparatus as claimed in claim 13, wherein said portable computer is a laptop computer.

15. A reproduction apparatus as claimed in claim 11, wherein said data comprises reproduction apparatus diagnostic data stored in said internal memory.

16. A reproduction apparatus as claimed in claim 9, wherein said communication interface further includes command input means for receiving commands transmitted from said diagnostic and administrative device via said telephone lines and modem.

* * * * *